US011677085B2

United States Patent
Lee (10) Patent No.: US 11,677,085 B2
(45) Date of Patent: Jun. 13, 2023

(54) METHOD FOR CALCULATING VOLTAGE LOSS OF FUEL CELL AND SYSTEM PERFORMING THE SAME

(71) Applicants: Hyundai Motor Company, Seoul (KR); Kia Motors Corporation, Seoul (KR)

(72) Inventor: Minsu Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 317 days.

(21) Appl. No.: 17/189,527

(22) Filed: Mar. 2, 2021

(65) Prior Publication Data

US 2021/0184235 A1    Jun. 17, 2021

Related U.S. Application Data

(62) Division of application No. 16/141,256, filed on Sep. 25, 2018, now Pat. No. 10,964,963.

(30) Foreign Application Priority Data

Nov. 10, 2017    (KR) .......................... 10-2017-0149123

(51) Int. Cl.
*H01M 8/04537* (2016.01)
*H01M 8/04992* (2016.01)
*H01M 8/04664* (2016.01)

(52) U.S. Cl.
CPC ... *H01M 8/04559* (2013.01); *H01M 8/04582* (2013.01); *H01M 8/04649* (2013.01); *H01M 8/04679* (2013.01); *H01M 8/04992* (2013.01)

(58) Field of Classification Search
CPC ......... H01M 8/04559; H01M 8/04582; H01M 8/04649; H01M 8/04679; H01M 8/04992
See application file for complete search history.

(56) References Cited

U.S. PATENT DOCUMENTS 7,577,536 B1    8/2009  Chisholm et al.
2018/0102559 A1*  4/2018  Kim ..................... H01M 8/0494

FOREIGN PATENT DOCUMENTS

JP    2005-166601 A    6/2005
KR    100839039 B1    6/2008
(Continued)

OTHER PUBLICATIONS

K.R. Cooper, M. Smith, "Electrical test methods for on-line fuel cell ohmic resistance measurement", Journal of Power Sources 160 (2006) 1088-1095.

(Continued)

*Primary Examiner* — Christopher P Domone
*Assistant Examiner* — Kimberly Wyluda
(74) *Attorney, Agent, or Firm* — Fox Rothschild LLP (57) ABSTRACT

A method for calculating voltage loss of a fuel cell is provided. The method includes sensing an open circuit voltage that is generated in a stack when the switch is opened and detecting an operation voltage and an operation current that are generated in the stack when the switch is closed. A first change graph of voltage data over time is calculated using the voltage data and current data from a time when the switch is opened in a state where the switch is closed. A first voltage of a point at which a trend line for an interval where the voltage data linearly varies with the time meets the first change graph is sensed and then an ohmic resistance voltage loss is calculated using a difference between the first voltage and the operation voltage.

8 Claims, 9 Drawing Sheets

(56) References Cited

FOREIGN PATENT DOCUMENTS

| | | | |
|---|---|---|---|
| KR | 101103707 | B1 | 1/2012 |
| KR | 10-2015-0019793 | A | 2/2015 |
| KR | 101655506 | B1 | 9/2016 |

OTHER PUBLICATIONS

Electrochemical Methods: Fundamentals and Applications, 2nd Edition A. J. Bard, L.R. Faulkner ISBN-13: 978-0471043720.

* cited by examiner

METHOD FOR CALCULATING VOLTAGE LOSS OF FUEL CELL AND SYSTEM PERFORMING THE SAME

CROSS-REFERENCE TO RELATED APPLICATION

This application is a Divisional of U.S. application Ser. No. 16/141,256 filed on Sep. 25, 2018, which claims priority to and the benefit of Korean Patent Application No. 10-2017-0149123 filed on Nov. 10, 2017, the entire contents of which are incorporated herein by reference.

BACKGROUND

(a) Field of the Invention

The present invention relates to a method for calculating voltage loss of a fuel cell and a system performing the method to calculate a voltage loss due to an active resistance, a voltage loss due to an ohmic resistance, and a voltage loss due to a mass transfer resistance in a fuel cell system including a stack that generates power using air and hydrogen.

(b) Description of the Related Art

It is necessary to measure a voltage loss and to characterize a resistance component to determine a degree of deterioration of performance of a fuel cell stack and to accurately determine a cause of deterioration. Resistance measurement using alternating current (AC) impedance, measurement of high frequency resistance (HFR) using an alternating current (AC) milliohm meter, and measurement of ohmic resistance using a current cutoff method are widely used to measure a resistance characteristic of the fuel cell stack or a unit cell of a fuel cell.

Figure 1:
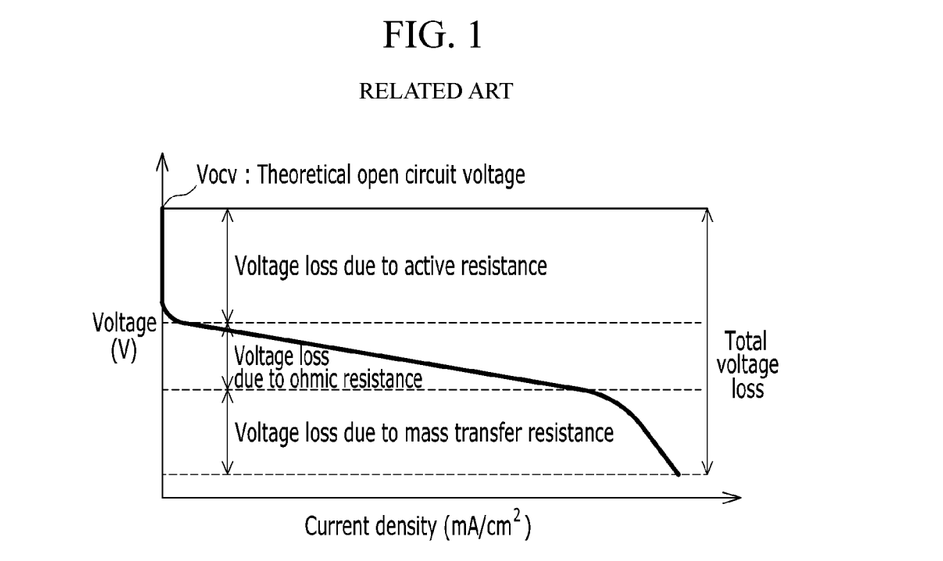
FIG. 1 is a graph showing a typical voltage loss according to the related art.

FIG. 1 is a graph showing a typical voltage loss according to the related art. Referring to FIG. 1, a horizontal axis of the graph represents current density ($mA/cm^2$), a vertical axis of the graph represents the cell voltage, and a total voltage loss of the fuel cell under operation is composed of various components.

Although resistance measurement method using AC impedance is widely used for separating or obtaining components of voltage loss and each resistance component, a substantial amount of time is required to measure impedance of wide band (e.g., several tens kHz to several MHz) and perform equivalent circuit modeling and nonlinear analysis in the resistance measurement method using AC impedance. Additionally, to measure all the resistance components of each cell constituting the stack using the impedance measurement, it is necessary to sequentially test all the cells or equipment for simultaneously inputting alternating current to the cells to be measured. Thus, composition of equipment for the resistance measurement method using AC impedance becomes complex and a cost for performing the resistance measurement method increases.

A developed simplified method is a resistance measurement method using the AC milliohm meter and the current cutoff method. However, these methods have a rapid measurement time (e.g., a few seconds) but measure only the ohmic resistance and do not measure the remaining resistance components (i.e., the active resistance and the mass transfer resistance). Thus, it is difficult to identify a cause of performance deterioration of the fuel cell stack and the cell.

The above information disclosed in this section is merely for enhancement of understanding of the background of the invention and therefore it may contain information that does not form the prior art that is already known in this country to a person of ordinary skill in the art.

SUMMARY

The present invention provides a method for calculating voltage loss of a fuel cell and a system performing the same that are capable of effectively and rapidly calculating a voltage loss due to an active resistance, a voltage loss due to an ohmic resistance, and a voltage loss due to a mass transfer resistance to more easily determine a degree of deterioration of the fuel cell.

An exemplary embodiment of the present invention provides the method for calculating voltage loss of the fuel cell that includes a stack including cells, a power load using a current and a voltage generated in the stack, a monitoring terminal connected to the cells to sense the current and the voltage, a switch provided on a circuit that connects the power load and the stack, and a controller configured to execute operations of the switch and the stack. The method may include sensing, by the controller, an open circuit voltage generated in the stack when the switch is opened; detecting, by the controller, an operation voltage and a operation current generated in the stack when the switch is closed; calculating, by the controller, a first change graph of voltage data over time using the voltage data and current data from a time when the switch is opened in a state where the switch is closed, and sensing a first voltage of a point at which a trend line for an interval where the voltage data linearly varies with the time meets the first change graph; and calculating, by the controller, an ohmic resistance voltage loss using a difference value between the first voltage and the operation voltage.

The method for calculating voltage loss of the fuel cell may further include: calculating, by the controller, a second change graph of the voltage data over square root of the time, and calculating a second voltage of a point at which a trend line for an interval where the voltage data linearly varies with the square root time meets the second change graph; and calculating, by the controller, a mass transfer resistance voltage loss using a difference value between the open circuit voltage and the second voltage.

Additionally, the method may include: calculating, by the controller, an active resistance voltage loss by subtracting the mass transfer resistance voltage loss and the ohmic resistance voltage loss from the open circuit voltage. The controller may be configured to measure changes in the voltage data and the current data with respect to the time in a predetermined time unit using an oscilloscope or a data recorder connected to the monitoring terminal.

Another exemplary embodiment of the present invention provides the method for calculating voltage loss of the fuel cell that includes a stack including cells, a power load using a current and a voltage generated in the stack, a monitoring terminal connected to the cells to sense the current and the voltage, a switch provided on a circuit that connects the power load and the stack, and a controller configured to execute operations of the switch and the stack. The method may include sensing, by the controller, an open circuit voltage generated in the stack when the switch is opened; calculating, by the controller, a first change graph of voltage data over time using the voltage data and current data generated from a time when the switch is closed in a state where the switch is opened, and sensing a highest first voltage in an interval where the voltage data linearly varies with the time; detecting, by the controller, an operation voltage generated in the stack when the switch is closed; and calculating, by the controller, an ohmic resistance voltage loss using a difference value between the highest first voltage and the operation voltage.

The method for calculating voltage loss of the fuel cell may further include: calculating, by the controller, a second change graph of the voltage data over square root of the time, and calculating a lowest second voltage in an interval where the voltage data linearly varies with the square root time; and calculating, by the controller, a mass transfer resistance voltage loss using a difference value between the open circuit voltage and the lowest second voltage. In addition, the method may include: calculating, by the controller, an active resistance voltage loss by subtracting the mass transfer resistance voltage loss and the ohmic resistance voltage loss from the open circuit voltage.

Another exemplary embodiment of the present invention may provide the method for calculating voltage loss of a power supply that includes a power load using a current and a voltage generated in the power supply, a monitoring terminal connected to the power supply to sense the current and the voltage, a switch provided on a circuit that connects the power load and the power supply, and a controller configured to execute operations of the switch and the power supply. The method may include sensing, by the controller, an open circuit voltage generated in the power supply when the switch is opened; sensing, by the controller, an operation voltage and a operation current generated in the power supply when the switch is closed; calculating, by the controller, a first change graph of voltage data over time using the voltage data and current data from a time when the switch is opened in a state where the switch is closed, and sensing a highest first voltage that corresponds to a point at which a trend line for an interval where the voltage data linearly varies with the time meets the first change graph; and calculating, by the controller, an ohmic resistance voltage loss using a difference value between the highest first voltage and the operation voltage.

The method may further include: calculating, by the controller, a second change graph of the voltage data over square root of the time, and calculating a lowest second voltage that corresponds to a point at which a trend line for an interval where the voltage data linearly varies with the square root time meets the second change graph; and calculating, by the controller, a mass transfer resistance voltage loss using a difference value between the open circuit voltage and the lowest second voltage. In addition, the method may include: calculating, by the controller, an active resistance voltage loss by subtracting the mass transfer resistance voltage loss and the ohmic resistance voltage loss from the open circuit voltage. The controller may be configured to measure changes in the voltage data and the current data with respect to the time in a predetermined time unit using an oscilloscope or a data recorder connected to the monitoring terminal.

Another exemplary embodiment of the present invention may provide the method for calculating voltage loss of the power supply that includes a power load using a current and a voltage generated in the power supply, a monitoring terminal connected to the power supply to sense the current and the voltage, a switch provided on a circuit that connects the power load and the power supply, and a controller configured to execute operations of the switch and the power supply. The method may include sensing, by the controller, an open circuit voltage generated in the stack when the switch is opened; calculating, by the controller, a first change graph of voltage data over time using the voltage data and current data generated from a time when the switch is closed in a state where the switch is opened, and sensing a highest first voltage in an interval where the voltage data linearly varies with the time; sensing, by the controller, an operation voltage generated in the stack when the switch is closed; and calculating, by the controller, an ohmic resistance voltage loss using a difference value between the highest first voltage and the operation voltage.

The method for calculating voltage loss of the fuel cell may further include: calculating, by the controller, a second change graph of the voltage data over square root of the time, and calculating a lowest second voltage in an interval where the voltage data linearly varies with the square root time; and calculating, by the controller, a mass transfer resistance voltage loss using a difference value between the open circuit voltage and the lowest second voltage. The method may also include: calculating, by the controller, an active resistance voltage loss by subtracting the mass transfer resistance voltage loss and the ohmic resistance voltage loss from the open circuit voltage.

An exemplary embodiment of the present invention provides the system performing the method for calculating voltage loss of the fuel cell that may include: a stack including cells; a power load using a current and a voltage generated in the stack; a monitoring terminal connected to the cells to sense the current and the voltage; a switch provided on a circuit that connects the power load and the stack; and a controller configured to execute operations of the switch and the stack, sense an open circuit voltage generated in the stack when the switch is opened, detect an operation voltage and a operation current generated in the stack in a state where the switch is closed, calculate a first change graph of voltage data over time using the voltage data and current data from a time when the switch is opened when the switch is closed, sense a first voltage of a point at which a trend line for an interval where the voltage data linearly varies with the time meets the first change graph, and calculate an ohmic resistance voltage loss using a difference value between the first voltage and the operation voltage.

The controller may be configured to calculate a second change graph of the voltage data over square root of the time, calculate a second voltage of a point at which a trend line for an interval where the voltage data linearly varies with the square root time meets the second change graph, and calculate a mass transfer resistance voltage loss using a difference value between the open circuit voltage and the second voltage. The controller may further be configured to calculate an active resistance voltage loss by subtracting the mass transfer resistance voltage loss and the ohmic resistance voltage loss from the open circuit voltage. Additionally, the controller may be configured to measure changes in the voltage data and the current data with respect to the time in a predetermined time unit using an oscilloscope or a data recorder connected to the monitoring terminal.

Another exemplary embodiment of the present invention provides the system performing the method for calculating voltage loss of the fuel cell that may include: a stack including cells; a power load using a current and a voltage generated in the stack; a monitoring terminal connected to the cells to sense the current and the voltage; a switch provided on a circuit that connects the power load and the stack; and a controller configured to execute operations of the switch and the stack, to sense an open circuit voltage generated in the stack when the switch is opened, to calculate a first change graph of voltage data over time using the voltage data and current data generated from a time when the switch is closed in a state where the switch is opened, to sense a highest first voltage in an interval where the voltage data linearly varies with the time, to detect an operation voltage generated in the stack when the switch is closed, and to calculate an ohmic resistance voltage loss using a difference value between the highest first voltage and the operation voltage.

The controller may be configured to calculate a second change graph of the voltage data over square root of the time, to calculate a lowest second voltage in an interval where the voltage data linearly varies with the square root time, to calculate a mass transfer resistance voltage loss using a difference value between the open circuit voltage and the lowest second voltage, and to calculate an active resistance voltage loss by subtracting the mass transfer resistance voltage loss and the ohmic resistance voltage loss from the open circuit voltage. The method for calculating voltage loss of the fuel cell according to the exemplary embodiment of the present invention may effectively and rapidly calculate the voltage loss due to the active resistance, the voltage loss due to the ohmic resistance, and the voltage loss due to the mass transfer resistance by using a change characteristic of an electric current and a voltage generated by closing or opening a switch disposed between the stack and the power load.

Further, a charge step method according to an exemplary embodiment of the present invention may minimize or reduce a change of an operation state of the fuel cell by reducing the switch opening and closing time to within a few seconds. Thus, the exemplary embodiment of the present invention may suppress deformation and deterioration of the cell or the stack due to a thermal shock during measurement of a characteristic of the fuel cell, and according to the exemplary embodiment of the present invention, it is not necessary to stop or restart a load operation of the fuel cell during measurement of the characteristic of the fuel cell.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. The sizes and thicknesses of the configurations shown in the drawings are provided selectively for the convenience of description, such that the present invention is not limited to those shown in the drawings and the thicknesses are exaggerated to make some parts and regions clear.

However, parts which are not related with the description are omitted for clearly describing the exemplary embodiment of the present invention, and like reference numerals refer to like or similar elements throughout the specification. In the following description, dividing names of components into first, second, and the like is to divide the names because the names of the components are the same as each other, and an order thereof is not particularly limited.

Figure 2:
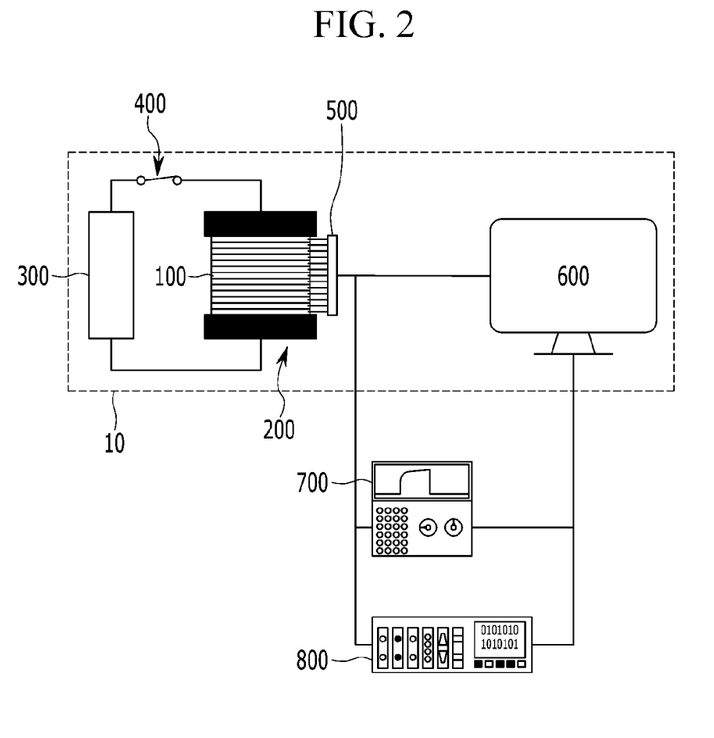
FIG. 2 is a schematic configuration diagram of a fuel cell system according to an exemplary embodiment of the present invention.

FIG. 2 is a schematic configuration diagram of a fuel cell system according to an exemplary embodiment of the present invention. Referring to FIG. 2, a fuel cell (or the fuel cell system) 10 that is a power supply system or an electric power source may include a stack 200 having a plurality of cells 100, a monitoring terminal 500, a switch 400, a power load (e.g., an electronic load) 300, and a control unit (or a controller) 600. An oscilloscope 700 and a data recorder 800 may be connected or coupled to the fuel cell system 10.

In particular, the power load 300 may consume an electrical energy generated from the stack 200 and may include a driving motor configured to drive a vehicle and an electrical component (e.g., the electrical component of the vehicle). The switch 400 may be provided or disposed on a circuit, which electrically connects the stack 200 and the power load 300, to supply a current or a voltage generated in the stack 200 to the power load 300 or to block the current or the voltage from the stack. An electric power of the stack 200 may be supplied to the power load 300 when the switch 400 is closed, and the electric power may be blocked when the switch is opened.

The oscilloscope 700 and the data recorder 800 may be configured to measure a change in a voltage and a current generated in a cell 100 or the stack 200 in units of several tens of nanometers to several hundreds of microseconds. The oscilloscope 700 and the data recorder 800 may be configured to measure the voltage and the current of the stack 200 or the cell 100 when an operation state of the fuel cell system is changed. The controller 600 may be configured to execute an operation of the fuel cell 10. In particular, the controller 600 may be configured to transmit and receive a signal to and from the oscilloscope 700 and the data recorder 800 to calculate each resistance component and a voltage loss due to each resistance component using the received current value or the received voltage value. The controller 600 may then be configured to operate the fuel cell system based on the calculated ohmic resistance voltage loss.

An exemplary embodiment of the present invention may use a charge step method to measure a voltage loss of the stack 200 or the cell 100 and to derive a voltage loss through each resistance component (i.e., ohmic resistance, active resistance (or activation resistance), and mass transfer resistance). The stack 200 may include the cells 100 and may have a structure in which a potential difference is generated between both electrodes when hydrogen is supplied to an anode of the stack and air is supplied to a cathode of the stack. The stack 200 may generate an open circuit voltage when the switch 400 is opened and may generate a closed circuit voltage when the switch 400 is closed.

In an exemplary embodiment of the present invention, an electric power produced by the fuel cell stack 200 may vary based on an amount of current required by the power load 300. When performance of the cell 100 or the stack 200 is evaluated to determine a characteristic of the cell or the stack, the charge step method may be performed as a method of measuring the voltage loss and the resistance and may use current and voltage variations of the cell or the stack. For example, the controller 600 may be one or more microprocessors operated by a program or hardware including the microprocessor. The program may include a series of commands for executing the method according to the exemplary embodiment of the present invention, which will be described below. The commands may be stored in a memory.

Figure 3:
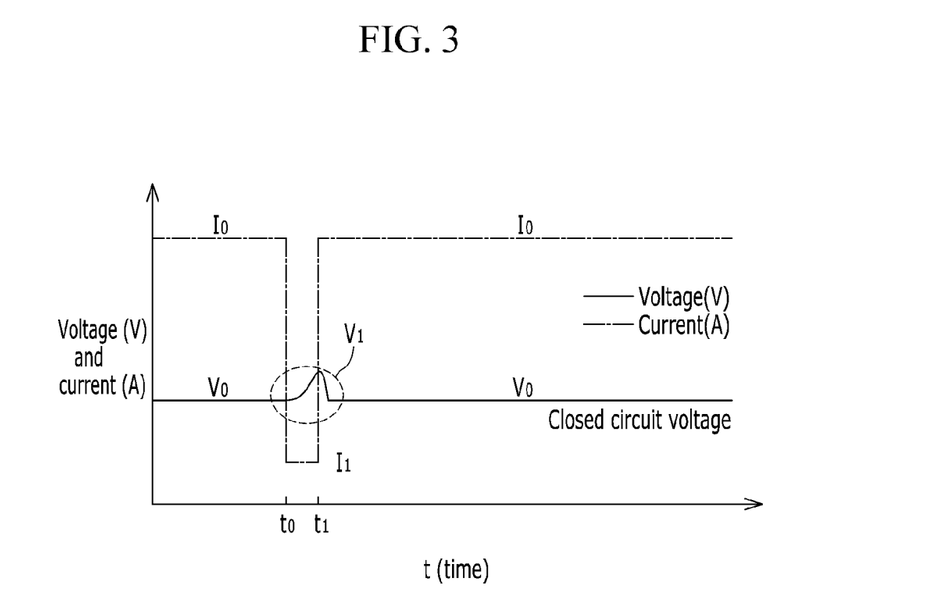
FIG. 3 is a graph showing a relationship of a current and a voltage over time in the fuel cell system according to an exemplary embodiment of the present invention.

FIG. 3 is a graph showing a relationship of a current and a voltage over time in the fuel cell system according to an exemplary embodiment of the present invention. Referring to FIG. 3, a horizontal axis of the graph represents time and a vertical axis of the graph represents voltage and current. When the switch 400 is opened and closed for a short period of time while the cell 100 or the stack 200 of the fuel cell is operating at a constant current $I_0$ and a constant voltage $V_0$, a current of the fuel cell may be instantaneously interrupted and the current may sequentially change in a step form of $I_0$, $I_1$, and $I_0$. The current $I_1$ may have a value of 0 ampere. The voltage may sequentially change in a step form of $V_0$, $V_1$, and $V_0$ when the current changes stepwise. When the time for opening and closing the switch 400 is short, the voltage change may appear in a form of a pulse as shown in FIG. 3. The voltage $V_1$ may approach an open circuit voltage $V_{OCV}$ when a time for opening the switch 400 increases.

The charge step method according to the exemplary embodiment of the present invention may minimize a change of an operating state of the fuel cell 10 by decreasing the opening and closing time of the switch 400 to within a few seconds. Thus, the exemplary embodiment of the present invention may suppress deformation and deterioration of the cell 100 or the stack 200 due to a thermal shock during measurement of a characteristic of the fuel cell, and according to the exemplary embodiment of the present invention, it is not necessary to stop or restart an operation of the fuel cell during measurement of the characteristic of the fuel cell.

Figure 4:
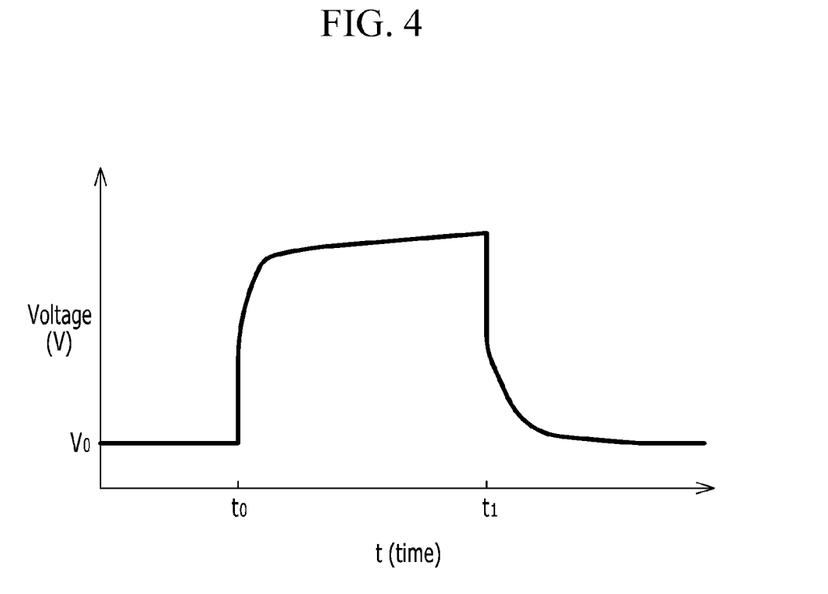
FIG. 4 is a graph showing in detail the relation of the current and the voltage according to time t in the fuel cell system according to an exemplary embodiment of the present invention.

FIG. 4 is a graph showing in detail the relationship of the current and the voltage according to time t in the fuel cell system according to an exemplary embodiment of the present invention. FIG. 4 shows a voltage-time curve obtained by extending a period between $t_0$ and $t_1$ in FIG. 3 to several milliseconds.

It may be possible to obtain information necessary for the charge step method by observing the voltage change using the oscilloscope 700 or the high-speed data recorder 800 in the period between $t_0$ and $t_1$ when the operation voltage $V_0$ changes by opening and closing the switch 400. The $t_0$ denotes a time when the switch 400 is opened (e.g., a circuit breaking time), and the $t_1$ denotes a time when the switch 400 is closed again (e.g., a circuit connection time). To execute the charge step method, the period between $t_0$ and $t_1$ may be 1 second.

As shown in FIG. 4, the voltage of the fuel cell 100 or the stack 200 may sharply increase at a time point to when the switch 400 is opened. This sudden voltage change may mean that the voltage loss caused by the ohmic resistance is linearly recovered when the current is removed. When the voltage loss due to the ohmic resistance is fully recovered, the voltage losses due to the activation and mass transfer resistances may be sequentially recovered and may appear to be in a nonlinear form.

Figure 5:
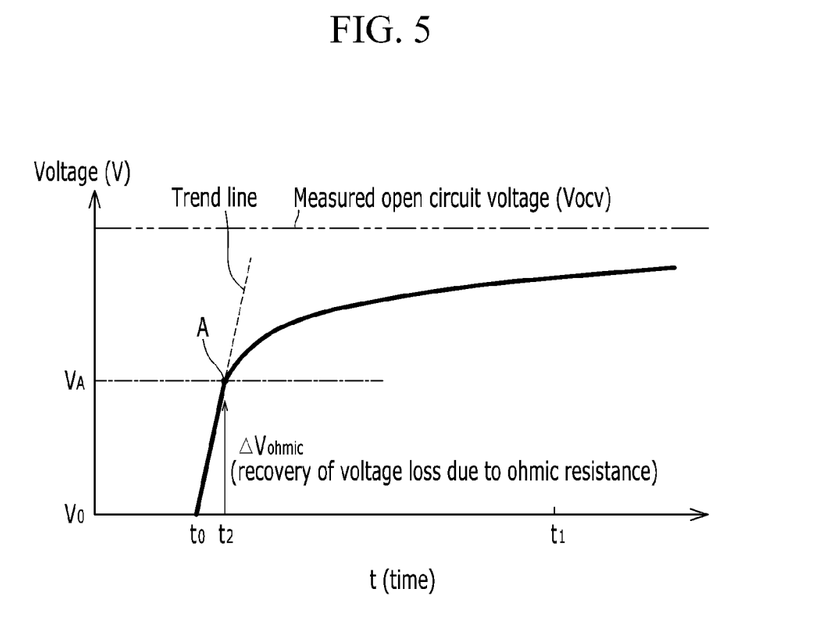
FIG. 5 is a graph showing a voltage over time t in the fuel cell system according to an exemplary embodiment of the present invention.

FIG. 5 is a graph showing a voltage over time t in the fuel cell system according to an exemplary embodiment of the present invention. In particular, FIG. 5 shows a voltage-time curve obtained by extending or enlarging the voltage-time curve of FIG. 4 to several tens to several hundreds of microseconds. When the current is instantaneously cut off by the charge step method, the voltage loss due to the ohmic resistance may be restored to linearly restore the voltage for a very short period of time. The voltage loss due to the ohmic resistance may be usually recovered within several tens to several hundreds of microseconds. A trend line for an interval where the voltage linearly varies with time may be created using linear regression analysis. The voltage loss $-V_{ohmic}=(V_A-V_0)$ due to the ohmic resistance may be obtained using a point A at which the trend line meets the voltage-time curve.

FIG. 5 shows a nonlinear voltage recovery curve after $t_2$ showing the recovery of the voltage loss caused by the activation and mass transfer resistances. The following equation {1} may determine a relationship of a recovery of the activation resistance voltage loss ($\Delta$Vact) according to an oxidation-reduction reaction by electrons and the time. For example, $\tau_c$ in the equation {1} may be a constant. The following equation {2} may determine a relationship of a recovery of the mass transfer resistance voltage loss ($\Delta$Vmt) according to gas diffusion and the time.

$$\ln(\Delta V_{act}) \propto \frac{t}{\tau_c} \quad \{1\}$$

$$\Delta V_{mt} \propto \sqrt{t} \quad \{2\}$$

Figure 6:
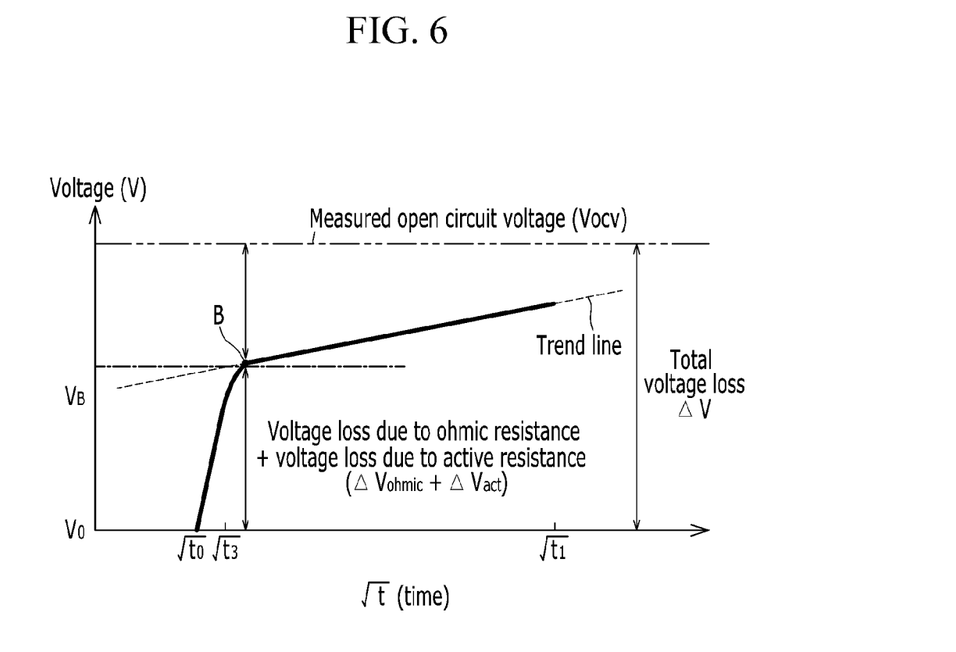
FIG. 6 is a graph showing a voltage over time ($\sqrt{t}$) in the fuel cell system according to an exemplary embodiment of the present invention.

FIG. 6 is a graph showing a voltage over square root of time ($\sqrt{t}$) in the fuel cell system according to an exemplary embodiment of the present invention. Referring to FIG. 6, after a square root $t_3$ ($\sqrt{t_3}$) time point where the recovery of the voltage losses due to the ohmic resistance and the activation resistance is completed, a relation of the voltage and the square root time ($\sqrt{t}$) may linearly change as shown in the equation {2}.

A trend line for an interval where the voltage linearly varies with the square root time may be generated using linear regression analysis. The voltage loss $-V_{mt}=(V_{OCV}-V_B)$ due to the mass transfer resistance may be obtained using a point B where the trend line meets the voltage-square root time curve. As expressed by the following equation {3}, the voltage loss $V_{act}$ may be obtained using a relationship of a total voltage loss $-V$ and $-V_{ohmic}$ and $-V$mt. The total voltage loss $-V$ may be obtained from a difference between the open circuit voltage $V_{OCV}$ of the fuel cell and the steady state load operation voltage $V_0$.

$$\Delta V_{act}=\Delta V-(\Delta V_{ohmic}+\Delta V_{mt}) \quad \{3\}$$

The ohmic resistance, the mass transfer resistance, and the activation resistance may be obtained by dividing each voltage loss value obtained by the above method by the operation current $I_0$.

Figure 7:
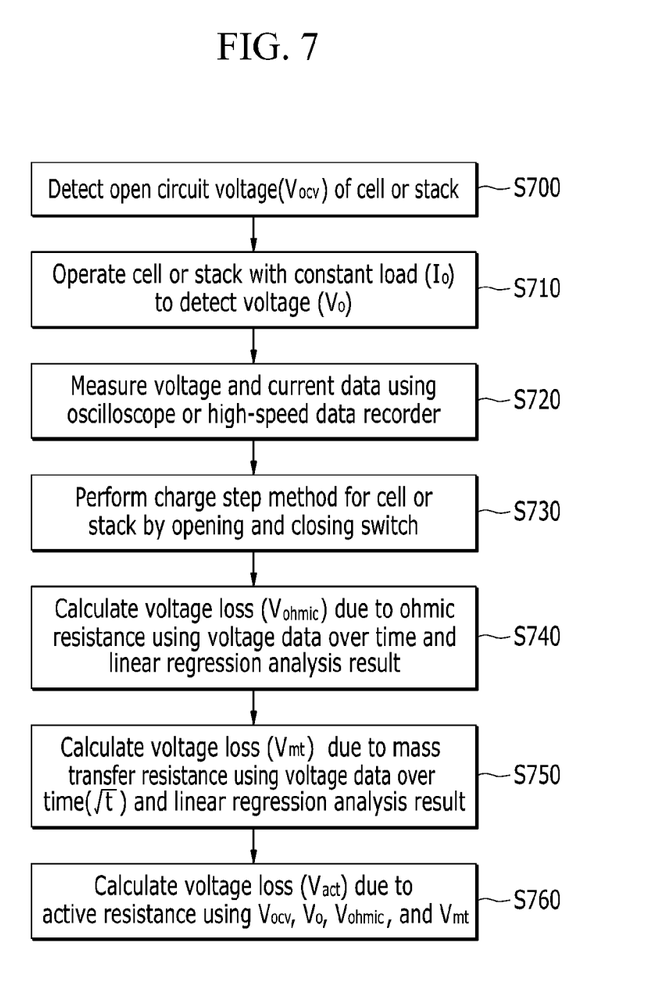
FIG. 7 is a flowchart showing a method for calculating a voltage loss of a fuel cell according to an exemplary embodiment of the present invention.

FIG. 7 is a flowchart showing a method for calculating a voltage loss of the fuel cell according to an exemplary embodiment of the present invention. A step S700 may include sufficient preprocessing to start a test of the fuel cell under a normal operating condition and a step of measuring and recording the open circuit voltage $V_{OCV}$ of the preprocessed fuel cell. A step S710 may include the load operation of the fuel cell in the steady state. In the step S710, the voltage value $V_0$ stabilized under the current value $I_0$ may be measured and recorded. The steady state may include a condition in which a voltage $V_0\pm5$ mV maintains for several minutes under the current $I_0$.

A step S720 may be a step of sensing or detecting a voltage and a current of the fuel cell 10 operating in the steady state at a predetermined time interval using the oscilloscope 700 or the high-speed data recorder 800 before opening and closing the switch 400. The data recording interval may be set in a range of tens to hundreds of microseconds. A step S730 may be a step of recording the voltage and the current of the fuel cell at a predetermined time interval using the oscilloscope 700 or the high-speed data recorder 800 and of simultaneously opening and closing the switch 400 to generate instantaneous current interruption in the fuel cell operating state.

As shown in FIG. 5, a step S740 may be a step of collecting voltage-time data using the oscilloscope 700 or the high-speed data recorder 800, performing a linear regression analysis on an initial linear interval of the voltage-time curve corresponding to the voltage-time data, and obtaining the voltage loss $V_{ohmic}$ due to the ohmic resistance from an intersection of the trend line and the voltage-time curve.

As shown in FIG. 6, a step S750 may be a step of collecting voltage-square root time data using the oscilloscope 700 or the high-speed data recorder 800, performing a linear regression analysis on an linear interval of the voltage-square root time curve corresponding to the voltage-square root time data, and obtaining the voltage loss $V_{mt}$ due to the mass transfer resistance from an intersection of the trend line and the voltage-square root time curve.

A step S760 may be a step of calculating the voltage loss $V_{act}$ due to the active resistance using the $V_{OCV}$ obtained from the step S700, the $V_0$ obtained from the step S710, the $V_{ohmic}$ obtained from the step S740, the $V_{mt}$ obtained from the step S750, and the equation {3}.

Figure 8:
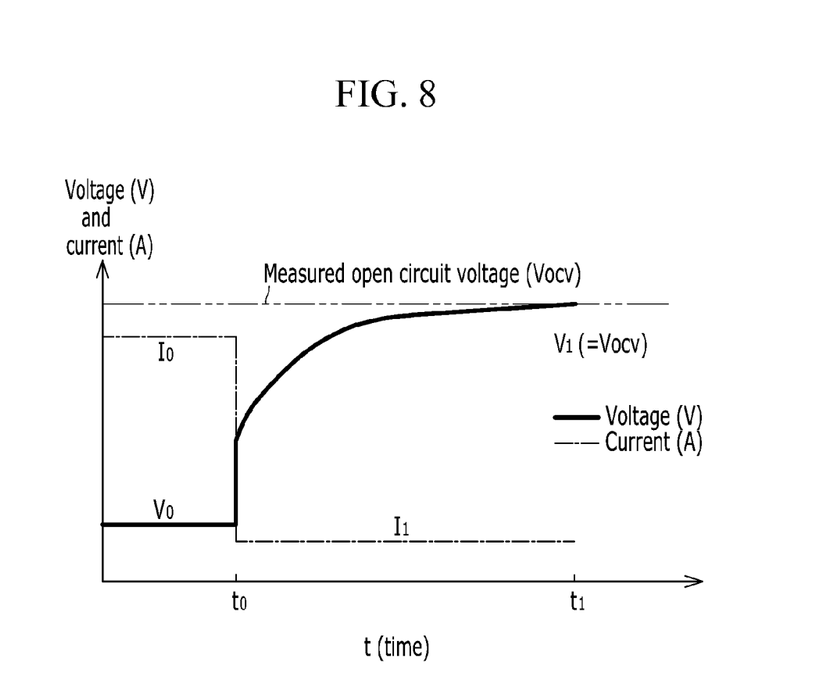
FIG. 8 is a graph showing a relationship between a current and a voltage of the fuel cell over time when a switch is opened from a closed state according to an exemplary embodiment of the present invention.

FIG. 8 is a graph showing a relationship between a current and a voltage of the fuel cell over time when the switch is opened from a closed state according to an exemplary embodiment of the present invention. FIG. 8 shows changes of the current and the voltage over time when the charge step method is applied to the fuel cell 10 that is in a normal operation. When the switch 400 is opened while the cell 100 or the stack 200 of the fuel cell is operating at a constant current $I_0$ and at a constant voltage $V_0$, a current of the fuel cell may be instantaneously interrupted so that the current sequentially changes in a step form of $I_0$ and $I_1$. The current $I_1$ may have a value of 0 ampere.

When an opening time (e.g., several tens of seconds to several minutes) of the switch 400 is substantial, the voltage of the fuel cell may be restored to the open circuit voltage Vocv. A method of obtaining the voltage loss due to the ohmic resistance, the mass transfer resistance, and the activation resistance is the same as or similar to the method described with reference to FIGS. 5 and 6. When the method is used, a result of the linear regression analysis for creating the linear trend line from the voltage-square root time graph may be more accurate. The method may be used when the load has to be completely removed from the fuel cell due to maintenance or malfunction of the fuel cell.

Figure 9:
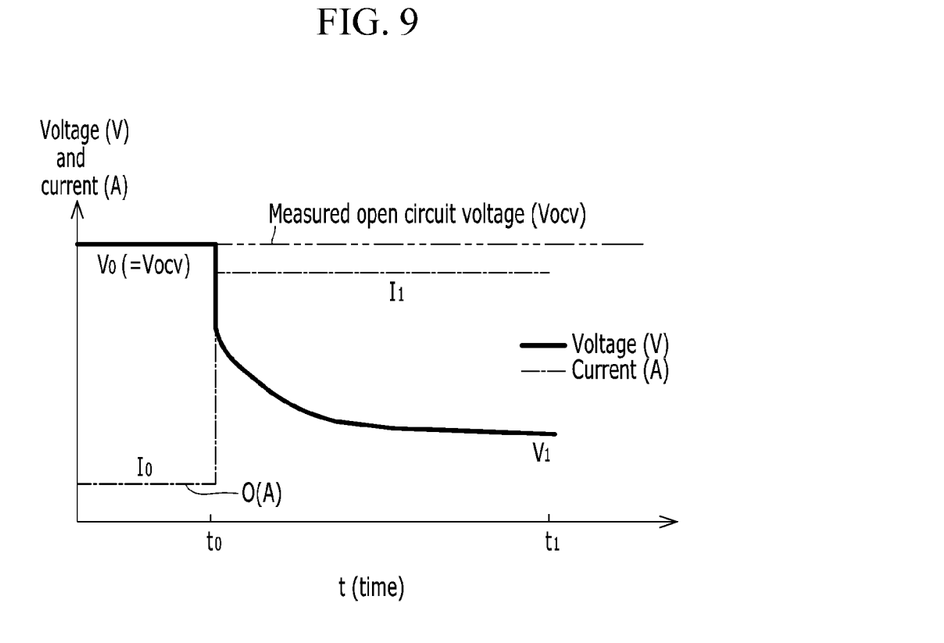
FIG. 9 is a graph showing a relationship between a current and a voltage of the fuel cell over time when the switch is closed from an opened state according to an exemplary embodiment of the present invention.

FIG. 9 is a graph showing a relationship between a current and a voltage of the fuel cell over time when the switch is closed from an opened state according to an exemplary embodiment of the present invention. FIG. 9 shows changes of the current and the voltage over time when the charge step method is applied to the fuel cell 10 that is in a standby state.

When the switch 400 is closed while a voltage across the cell 100 or the stack 200 of the fuel cell is an open circuit voltage $V_1$ and a current through the cell or the stack is blocked, the current may sequentially change in a step form of $I_0$ to $I_1$. The current $I_1$ may be maintained at a constant value. When the switch is connected or closed for several tens of seconds to several minutes, the voltage may be stabilized to a constant value such as $V_1$.

A method of obtaining the voltage loss due to the ohmic resistance, the mass transfer resistance, and the activation resistance is the same as or similar to the method described with reference to FIGS. 5 and 6. This method may be utilized when the fuel cell changes load from a standby state to a normal operation state.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: fuel cell
200: stack
100: cell
300: power load
400: switch
500: monitoring terminal
600: controller
700: oscilloscope
800: data recorder
Vocv: open circuit voltage

What is claimed is:

1. A method for calculating voltage loss of a fuel cell that includes a stack having cells, a power load using a current and a voltage generated in the stack, a monitoring terminal connected to the cells to sense the current and the voltage, a switch provided on a circuit that connects the power load and the stack, and a controller configured to execute operations of the switch and the stack, comprising:
sensing, by the controller, an open circuit voltage generated in the stack when the switch is opened;
calculating, by the controller, a first change graph of voltage data over time using the voltage data and current data generated from a time when the switch is closed to when the switch is opened, and sensing a highest first voltage in an interval where the voltage data linearly varies with the time;
detecting, by the controller, an operation voltage generated in the stack when the switch is closed; and
calculating, by the controller, an ohmic resistance voltage loss using a difference value between the highest first voltage and the operation voltage.

2. The method of claim 1, further comprising:
calculating, by the controller, a second change graph of the voltage data over square root of the time, and calculating a lowest second voltage in an interval where the voltage data linearly varies with the square root time; and
calculating, by the controller, a mass transfer resistance voltage loss using a difference value between the open circuit voltage and the lowest second voltage.

3. The method of claim 2, further comprising:
calculating, by the controller, an active resistance voltage loss by subtracting the mass transfer resistance voltage loss and the ohmic resistance voltage loss from the open circuit voltage.

4. A method for calculating a voltage loss of a power supply that includes a power load using a current and a voltage generated in the power supply, a monitoring terminal connected to the power supply to sense the current and the voltage, a switch provided on a circuit that connects the power load and the power supply, and a controller configured to execute operations of the switch and the power supply, comprising:
sensing, by the controller, an open circuit voltage generated in the stack when the switch is opened;
calculating, by the controller, a first change graph of voltage data over time using the voltage data and current data generated from a time when the switch is closed to a state when the switch is opened, and sensing a highest first voltage in an interval where the voltage data linearly varies with the time;
sensing, by the controller, an operation voltage generated in the stack when the switch is closed; and
calculating, by the controller, an ohmic resistance voltage loss using a difference value between the highest first voltage and the operation voltage.

5. The method of claim 4, further comprising:
calculating, by the controller, a second change graph of the voltage data over square root of the time, and calculating a lowest second voltage in an interval where the voltage data linearly varies with the square root time; and
calculating, by the controller, a mass transfer resistance voltage loss using a difference value between the open circuit voltage and the lowest second voltage.

6. The method of claim 5, further comprising:
calculating, by the controller, an active resistance voltage loss by subtracting the mass transfer resistance voltage loss and the ohmic resistance voltage loss from the open circuit voltage.

7. A system performing a method for calculating voltage loss of a fuel cell, comprising:
a stack including a plurality of cells;
a power load using a current and a voltage generated in the stack;
a monitoring terminal connected to the cells to sense the current and the voltage;
a switch provided on a circuit that connects the power load and the stack; and
a controller configured to:
control operations of the switch and the stack,
sense an open circuit voltage generated in the stack when the switch is opened;
calculate a first change graph of voltage data over time using the voltage data and current data generated from a time when the switch is closed to a state when the switch is opened;
sense a highest first voltage in an interval where the voltage data linearly varies with the time;
detect an operation voltage generated in the stack when the switch is closed; and
calculate an ohmic resistance voltage loss using a difference value between the highest first voltage and the operation voltage.

8. The system of claim 7, wherein the controller is configured to:

calculate a second change graph of the voltage data over square root of the time;

calculate a lowest second voltage in an interval where the voltage data linearly varies with the square root time;

calculate a mass transfer resistance voltage loss using a difference value between the open circuit voltage and the lowest second voltage; and calculate an active resistance voltage loss by subtracting the mass transfer resistance voltage loss and the ohmic resistance voltage loss from the open circuit voltage.

\* \* \* \* \*